US008228569B2

(12) United States Patent  (10) Patent No.: US 8,228,569 B2
Chen  (45) Date of Patent: Jul. 24, 2012

(54) IMAGE ACQUIRING APPARATUS AND IMAGE ACQUIRING METHOD FOR DETECTING AND RECOGNIZING SIZE OF SCAN TARGET WITHOUT USING SENSORS

(75) Inventor: Hsing-Lu Chen, Hsinchu (TW)

(73) Assignee: Avision Inc. (TW)

( * ) Notice: Subject to any disclaimer, the term of this patent is extended or adjusted under 35 U.S.C. 154(b) by 1122 days.

(21) Appl. No.: 12/110,356

(22) Filed: Apr. 28, 2008

(65) Prior Publication Data

US 2009/0147323 A1  Jun. 11, 2009

(30) Foreign Application Priority Data

Dec. 6, 2007 (TW) ................................ 96146474 A

(51) Int. Cl.
*H04N 1/04* (2006.01)
(52) U.S. Cl. ........................................ 358/488; 358/474
(58) Field of Classification Search .................. None
See application file for complete search history.

(56) References Cited

U.S. PATENT DOCUMENTS 6,520,414 B2 * 2/2003 Tanioka et al. .......... 235/462.33

* cited by examiner

*Primary Examiner* — Douglas Tran

(57) ABSTRACT

An image acquiring apparatus and image acquiring method are provided. The image acquiring apparatus includes an image sensor for outputting a plurality of first analog image signals corresponding to a plurality of pixels; an ADC for converting the plurality of first analog image signals to a plurality of digital image signals; a DAC for converting the plurality of digital image signals to a plurality of second analog image signals, wherein each of which has an actual voltage value; a comparing unit for respectively comparing the actual voltage values of the plurality of second analog image signals with a reference voltage value so as to generate a plurality of corresponding comparing results; a counting unit for adjusting a counting value according to each of the comparing results; and a control unit for determining whether to stop a scanning operation of the image acquiring apparatus or not according to the counting value.

15 Claims, 3 Drawing Sheets

IMAGE ACQUIRING APPARATUS AND IMAGE ACQUIRING METHOD FOR DETECTING AND RECOGNIZING SIZE OF SCAN TARGET WITHOUT USING SENSORS

BACKGROUND OF THE INVENTION

1. Field of the Invention

The present invention relates to an image acquiring apparatus and an image acquiring method, and more particularly, to an image acquiring apparatus and an image acquiring method that are able to detect and recognize size of a scan target during the scanning process without using sensors.

2. Description of the Prior Art

In general, there are two kinds of conventional methods for detecting the size of a scan target (such as a document or a picture) and determining a scanning area in the conventional image acquiring apparatus (such as a flatbed scanner). In the first kind of conventional method, a plurality of sensors (such as infrared sensors) are installed in the conventional image acquiring apparatus for detecting the size of the scan targets. However, when the scan targets may contain sheets of various sizes, more sensors must be installed. This means that the production cost of the image acquiring apparatus by implementing this conventional detecting method will be very high.

In the second kind of conventional method, the conventional image apparatus scans the overall scan window firstly, and then the conventional image apparatus obtains an image of a scan target by using an algorithm. In other words, in this kind of conventional method, the conventional image apparatus processes the data which got from scanning the overall scan window for obtaining the image of the scan target. In this way, the quantity of processed data will be constantly large. Thus, this conventional image apparatus has to use a CPU having higher capability and a faster direct memory access (DMA) controller (this means that using this kind of conventional image acquiring method and related image acquiring apparatus will also cost a lot). Otherwise, the image acquiring apparatus cannot perform the scanning operation efficiently, and missing data will probably occur often.

The image acquiring apparatus and the image acquiring method disclosed by the present invention can detect and recognize the size of the scan target without additional sensors during the scanning process and without being limited by the number of sensors and other factors, while the conventional image acquiring method and the related image acquiring apparatus cost a lot. The image acquiring apparatus and the image acquiring method disclosed by the present invention can perform the scanning operation efficiently without using a CPU having higher capability and a faster direct memory access (DMA) controller, and no data missing conditions will occur.

SUMMARY OF THE INVENTION

It is therefore one of the objectives of the present invention to provide an image acquiring apparatus and an image acquiring method that are able to detect and recognize the size of a scan target during the scanning process without using sensors, to solve the problems hereinbefore.

According to an embodiment of the present invention, an image acquiring apparatus is disclosed. The image acquiring apparatus includes an image sensor, an analog-to-digital converter (ADC), a digital-to-analog converter (DAC), a comparing unit, a counting unit, and a control unit. The image sensor is utilized for outputting a plurality of first analog image signals corresponding to a plurality of pixels. The ADC is utilized for converting the plurality of first analog image signals to a plurality of digital image signals. The DAC is coupled to the ADC unit, and utilized for converting the plurality of digital image signals to a plurality of second analog image signals, wherein each of which has an actual voltage value. The comparing unit is coupled to the DAC unit, and utilized for respectively comparing the actual voltage values of the plurality of second analog image signals with a reference voltage value so as to generate a plurality of corresponding comparing results. The counting unit is coupled to the comparing unit, and utilized for adjusting a counting value according to each of the plurality of comparing results. The control unit is coupled to the counting unit, and utilized for determining whether to stop a scanning operation of the image acquiring apparatus or not according to the counting value.

According to an embodiment of the present invention, an image acquiring method is disclosed. The image acquiring method includes: setting a reference voltage value; outputting a plurality of first analog image signals corresponding to a plurality of pixels; converting the plurality of first analog image signals to a plurality of digital image signals; converting the plurality of digital image signals to a plurality of second analog image signals respectively, wherein each of which has an actual voltage value; respectively comparing the actual voltage values of the plurality of second analog image signals with a reference voltage value so as to generate a plurality of corresponding comparing results; adjusting a counting value according to each of the comparing results; and determining whether to stop a scanning operation of the image acquiring apparatus or not according to the counting value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
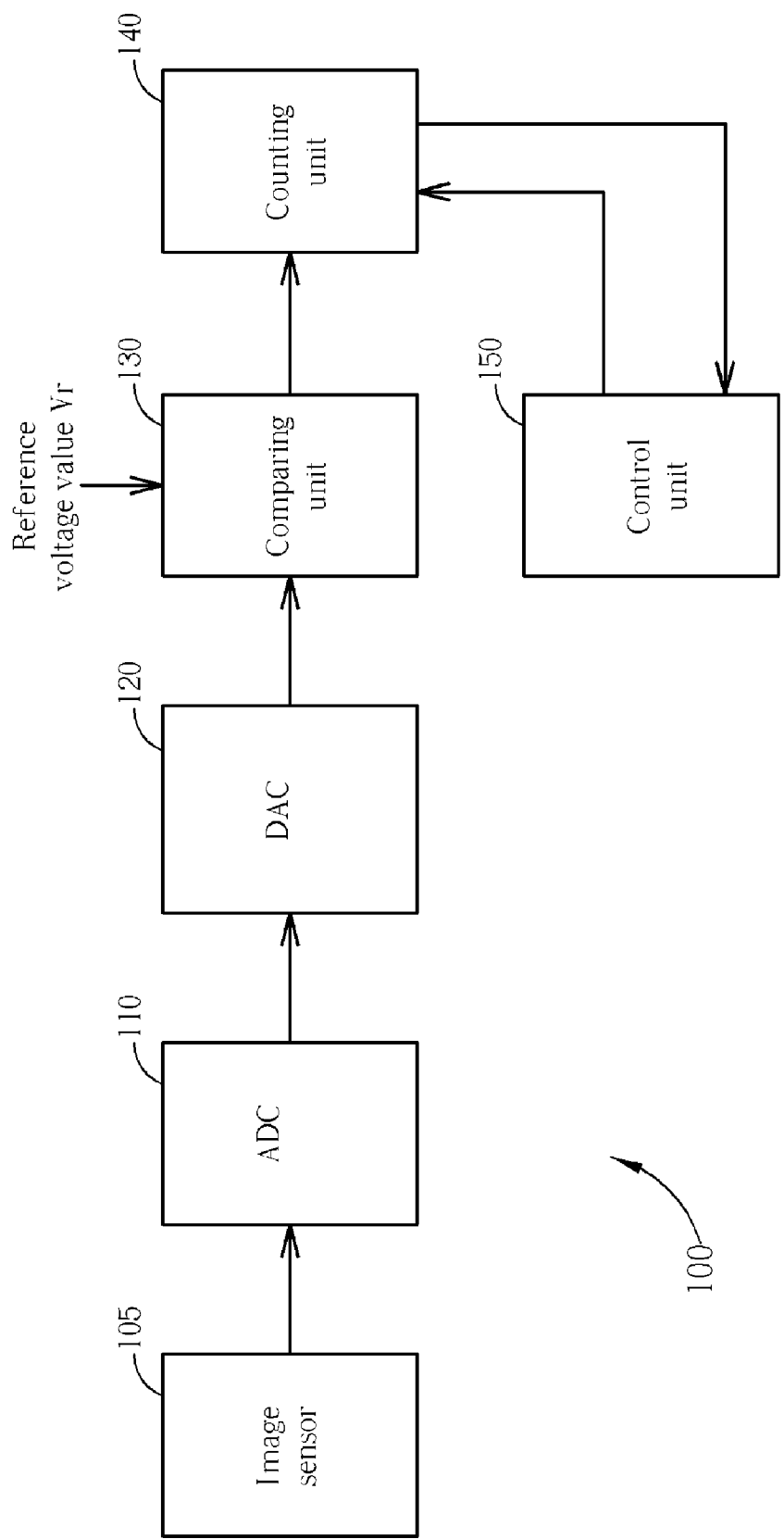
FIG. 1 shows a simplified block diagram of an image acquiring apparatus in accordance with an embodiment of the present invention.

Please refer to FIG. 1. FIG. 1 shows a simplified block diagram of an image acquiring apparatus 100 in accordance with an embodiment of the present invention. As shown in FIG. 1, the image acquiring apparatus 100 includes an image sensor 105, an analog-to-digital converter (ADC) 110, a digital-to-analog converter (DAC) 120, a comparing unit 130, a counting unit 140, and a control unit 150. The ADC 110 is coupled to the image sensor 105, and the DAC unit 120 is coupled to the ADC unit 110. The comparing unit 130 is coupled to the DAC unit 120, and the control unit 150 is coupled to the counting unit 140. In addition, the ADC can be realized by an analog front end (AFE) element. At first, the image acquiring method of the present invention sets a reference voltage value Vr as a threshold value for verifying a background image in the image acquiring apparatus 100. When setting the reference voltage value Vr, an optimal setting value of the reference voltage value Vr can be determined according to different scanning requirements. For example, when the background image is fully black, the reference voltage value Vr can be set to be equal to or a little higher than a relative voltage value of the background image. When the background image is fully white, the reference voltage value Vr can be set to be equal to or a little lower than a relative voltage value of the background image. Next, when the image acquiring apparatus 100 performs a scanning operation on a scan target (such as a document), the image sensor 105 is utilized for outputting a plurality of first analog image signals corresponding to a plurality of pixels. Next, the ADC 110 is utilized for converting the plurality of first analog image signals to a plurality of digital image signals, and then the DAC 120 is utilized for converting the plurality of digital image signals to a plurality of second analog image signals, wherein each of which has an actual voltage value. Next, the comparing unit 130 is utilized for respectively comparing the actual voltage values of the plurality of second analog image signals with the reference voltage value Vr so as to generate a plurality of corresponding comparing results, and then the counting unit 140 is utilized for adjusting a counting value according to each of the comparing results. Finally, the control unit 150 is utilized for determining whether to stop the scanning operation of the image acquiring apparatus 100 or not according to the counting value. Please note that the above embodiment is only for illustrative purposes and is not meant to be a limitation of the present invention.

In an image acquiring method according to a first embodiment of the present invention, the background image is assumed to be fully white, and the reference voltage value Vr is set to be equal to or a little lower than a relative voltage value of the background image. Thus, when one of the actual voltage values is higher than or equal to the reference voltage value Vr, the counting unit 140 will decrease or increase the counting value according to the comparing result. When one of the actual voltage values is lower than the reference voltage value Vr, the counting unit 140 won't adjust the counting value according to the comparing result. The pixels can be pixels of a specific number of scan line, and after scanning the specific number of scan line, if the counting value corresponding to the comparing results does not reach a specific value, then the control unit 150 will control the scanning operation of the image acquiring apparatus 100 to continue according to the counting value, and reset the counting value of the counting unit 140. When the counting value reaches the specific value, the control unit 150 will control the scanning operation of the image acquiring apparatus 100 to stop according to the counting value, and reset the counting value of the counting unit 140. In addition, when the counting unit 140 adjusts the counting value according to the comparing result, the counting unit 140 gradually increases the counting value from an initial value to the specific value, and a difference between the initial value and the specific value corresponds to a total pixel number of pixels. For example, assume the pixels are pixels of 3 scan lines and the initial value of the counting value is set to be 0, and each scan line has 300 pixels, respectively. When one of the actual voltage values is higher than or equal to the reference voltage value Vr, the counting unit 140 increases the counting value by 1 each time according to the comparing result. The above specific value is 900, and when the counting unit 140 gradually increases the counting value from 0 to 900, this means that the actual voltage values are all higher than or equal to the reference voltage value Vr; in other words, the image acquiring apparatus 100 has already been scanning the background image. Thus, the control unit 150 controls the scanning operation of the image acquiring apparatus 100 to stop according to the counting value, and reset the counting value of the counting unit 140 to be 0. Otherwise, when the image acquiring apparatus 100 has scanned 3 scan lines and the counting value does not reach 900, this means that the image acquiring apparatus 100 is still scanning the scan target image and has not scanned the background image yet. Thus, the control unit 150 controls the scanning operation to continue of the image acquiring apparatus 100 according to the counting value, and reset the counting value of the counting unit 140 to be 0. On the other hand, it is also practicable in the present invention to decrease the counting value by 1 each time according to the comparing result. Then, when the counting unit 140 gradually decreases the counting value from 900 to 0, this means the actual voltage values are all higher than or equal to the reference voltage value Vr; in other words, the image acquiring apparatus 100 has already been scanning the background image. Thus, the control unit 150 controls the scanning operation of the image acquiring apparatus 100 to stop according to the counting value. Otherwise, when the counting value does not reach 0, this means that at least one of the actual voltage values is lower than or equal to the reference voltage value Vr; in other words, the image acquiring apparatus 100 is still scanning the scan target image and has not scanned the background image yet. Thus, the control unit 150 controls the scanning operation of the image acquiring apparatus 100 to stop according to the counting value. Please note that the above embodiments are only for illustrative purposes and are not meant to be limitations of the present invention.

Figure 2:
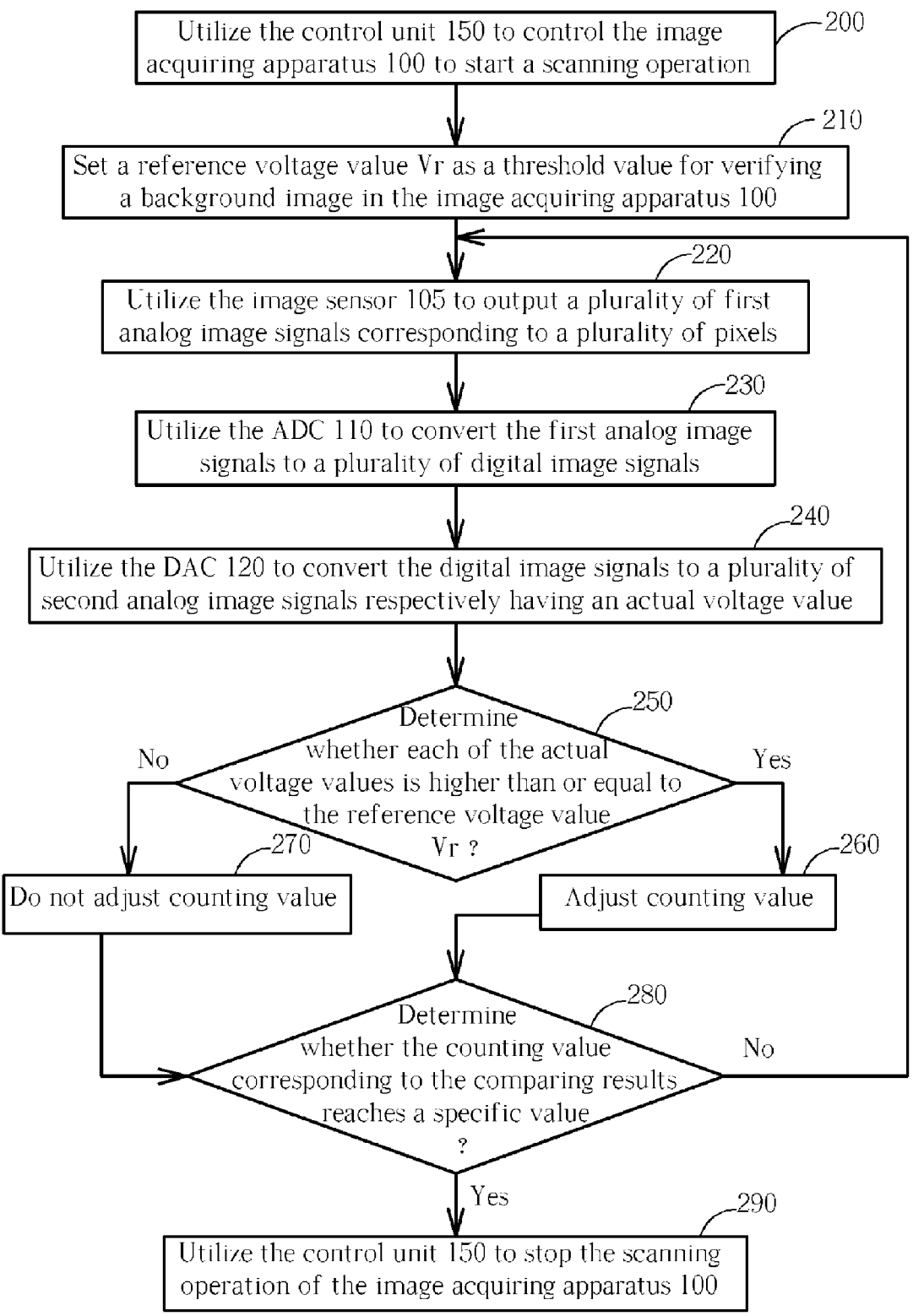
FIG. 2 is a flowchart showing the first embodiment of the image acquiring method according to the operation scheme of the above image acquiring apparatus in the present invention.

Please refer to FIG. 2. FIG. 2 is a flowchart showing a first embodiment of the image acquiring method according to the operation scheme of the above image acquiring apparatus 100 in the present invention. Provided that substantially the same result is achieved, the steps of the process flowchart need not be in the exact order shown in FIG. 2 and need not be contiguous: other steps can be intermediate. The first embodiment of the image acquiring method according to the present invention includes the following steps:

Step 200: Utilize the control unit 150 to control the image acquiring apparatus 100 to start a scanning operation.

Step 210: Set a reference voltage value Vr as a threshold value for verifying a background image in the image acquiring apparatus 100.

Step 220: Utilize the image sensor 105 to output a plurality of first analog image signals corresponding to a plurality of pixels, wherein the plurality of pixels are pixels (for example, 900 pixels) of a specific number of scan line (for example, 3 scan lines).

Step 230: Utilize the ADC 110 to convert the plurality of first analog image signals to a plurality of digital image signals Step 240: Utilize the DAC 120 to convert the plurality of digital image signals to a plurality of second analog image signals, wherein each of which has an actual voltage value.

Step 250: Utilize the comparing unit 130 to respectively compare the actual voltage values of the plurality of second analog image signals with the reference voltage value Vr so as to generate a plurality of corresponding comparing results. When one of the actual voltage values is higher than or equal to the reference voltage value Vr, then go to Step 260; when one of the actual voltage values is lower than the reference voltage value Vr, then go to Step 270.

Step 260: Utilize the counting unit 140 to adjust a counting value according to each of the comparing results, and then go to Step 280. The counting unit 140 gradually increases (or decreases) the counting value from an initial value (for example, 0) to a specific value (for example, 900) according to each of the comparing results.

Step 270: Utilize the counting unit 140 to not adjust the counting value according to each of the comparing results, and then go to Step 280.

Step 280: When the counting value corresponding to the comparing results does not reach the specific value (for example, 900), then go to Step 220; when the counting value corresponding to the comparing results reaches the specific value (for example, 900), then go to Step 290. A difference between the initial value (for example, 0) and the specific value (for example, 900) corresponds to a total number of the pixels (for example, 900).

Step 290: Utilize the control unit 150 to stop the scanning operation of the image acquiring apparatus 100.

Similar to the image acquiring method according to the first embodiment of the present invention, in an image acquiring method according to a second embodiment of the present invention, the image acquiring apparatus 100 in FIG. 1 is also utilized to perform a scanning operation, and thus further explanation of the details for the image acquiring apparatus 100 is omitted herein for the sake of brevity. In addition, the flowchart before the step of utilizing the comparing unit 130 (to respectively compare the actual voltage values of the plurality of second analog image signals with the reference voltage value Vr so as to generate a plurality of corresponding comparing results in the image acquiring method according to the second embodiment of the present invention) is the same as that in the image acquiring method according to the first embodiment of the present invention. The background image is assumed to be fully black in the image acquiring method according to the second embodiment of the present invention, however, and the reference voltage value Vr is set to be equal to or a little higher than a relative voltage value of the background image. Thus, when one of the actual voltage values is lower than or equal to the reference voltage value Vr, the counting unit 140 will decrease or increase the counting value according to the comparing result. When one of the actual voltage values is higher than the reference voltage value Vr, the counting unit 140 won't adjust the counting value according to the comparing result. The pixels also can be pixels of a specific number of scan lines, and after scanning the specific number of scan lines, if the counting value corresponding to the comparing results does not reach a specific value, then the control unit 150 will control the scanning operation of the image acquiring apparatus 100 to continue according to the counting value, and reset the counting value of the counting unit 140. When the counting value reaches the specific value, the control unit 150 will control the scanning operation of the image acquiring apparatus 100 to stop according to the counting value, and reset the counting value of the counting unit 140. In addition, when the counting unit 140 adjusts the counting value according to the comparing result, the counting unit 140 gradually increases the counting value from an initial value to the specific value, wherein a difference between the initial value and the specific value is corresponding to a total number of the pixels. For example, assume that the pixels are pixels of 3 scan lines and the initial value of the counting value is set to be 0, and each scan line has 300 pixels, respectively. When one of the actual voltage values is lower than or equal to the reference voltage value Vr, the counting unit 140 increments the counting value by 1 each time according to the comparing result. The above specific value is 900, and when the counting unit 140 gradually increases the counting value from 0 to 900, this means that the actual voltage values are all lower than or equal to the reference voltage value Vr; the image acquiring apparatus 100 has already scanned the background image. Thus, the control unit 150 controls the scanning operation of the image acquiring apparatus 100 to stop according to the counting value, and reset the counting value of the counting unit 140 to be 0. Otherwise, when the image acquiring apparatus 100 has scanned 3 scan lines and the counting value does not reach 900, this means that the image acquiring apparatus 100 is still scanning the scan target image and has not scanned the background image yet. Thus, the control unit 150 controls the scanning operation to continue of the image acquiring apparatus 100 according to the counting value, and reset the counting value of the counting unit 140 to be 0. On the other hand, it is also applicable in the present invention to decrease the counting value by 1 each time according to the comparing result. Then, when the counting unit 140 gradually increases the counting value from 900 to 0, this means that the actual voltage values are all lower than or equal to the reference voltage value Vr; in other words, the image acquiring apparatus 100 has already scanned the background image. Thus, the control unit 150 controls the scanning operation of the image acquiring apparatus 100 to stop according to the counting value. Otherwise, when the counting value does not reach 0, this means that at least one of the actual voltage values is higher than or equal to the reference voltage value Vr; the image acquiring apparatus 100 is still scanning the scan target image and has not scanned the background image yet. Thus, the control unit 150 controls the scanning operation of the image acquiring apparatus 100 to continue according to the counting value. Please note that the above embodiments are only for illustrative purposes and are not meant to be limitations of the present invention.

Figure 3:
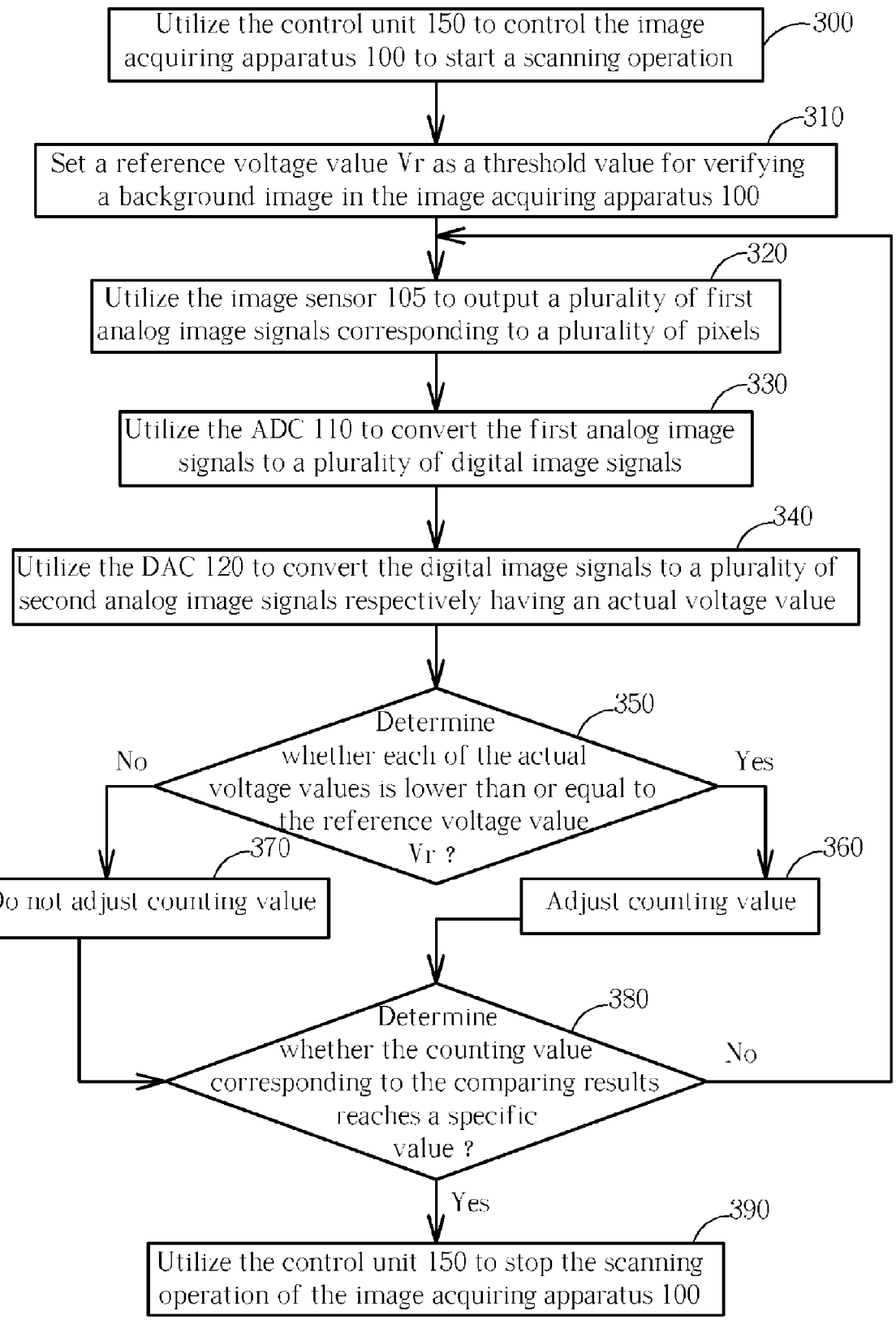
FIG. 3 is a flowchart showing the second embodiment of the image acquiring method according to the operation scheme of the above image acquiring apparatus in the present invention.

Please refer to FIG. 3. FIG. 3 is a flowchart showing a second embodiment of the image acquiring method according to the operation scheme of the above image acquiring apparatus 100 in the present invention. Provided that substantially the same result is achieved, the steps of the process flowchart need not be in the exact order shown in FIG. 3 and need not be contiguous: other steps can be intermediate. The first embodiment of the image acquiring method according to the present invention includes the following steps:

Step 300: Utilize the control unit 150 to control the image acquiring apparatus 100 to start a scanning operation.

Step 310: Set a reference voltage value Vr as a threshold value for verifying a background image in the image acquiring apparatus 100.

Step 320: Utilize the image sensor 105 to output a plurality of first analog image signals corresponding to a plurality of pixels, wherein the plurality of pixels are pixels (for example, 900 pixels) of a specific number of scan lines (for example, 3 scan lines).

Step 330: Utilize the ADC 110 to convert the plurality of first analog image signals to a plurality of digital image signals.

Step 340: Utilize the DAC 120 to convert the plurality of digital image signals to a plurality of second analog image signals, wherein each of which has an actual voltage value.

Step 350: Utilize the comparing unit 130 to respectively compare the actual voltage values of the plurality of second analog image signals with the reference voltage value Vr so as to generate a plurality of corresponding comparing results. When one of the actual voltage values is lower than or equal to the reference voltage value Vr, then go to Step 360; when one of the actual voltage values is higher than the reference voltage value Vr, then go to Step 370.

Step 360: Utilize the counting unit 140 to adjust a counting value according to each of the comparing results, and then go to Step 380. The counting unit 140 gradually increases (or decreases) the counting value from an initial value (for example, 0) to a specific value (for example, 900) according to each of the comparing results.

Step 370: Utilize the counting unit 140 to not adjust the counting value according to each of the comparing results, and then go to Step 380.

Step 380: When the counting value corresponding to the comparing results does not reach the specific value (for example, 900), then go to Step 320; when the counting value corresponding to the comparing results reaches the specific value (for example, 900), then go to Step 390. A difference between the initial value (for example, 0) and the specific value (for example, 900) corresponds to a total number of the pixels (for example, 900).

Step 390: Utilize the control unit 150 to stop the scanning operation of the image acquiring apparatus 100.

Briefly summarized, the image acquiring apparatus and the image acquiring method disclosed by the present invention does not need any sensors, and can still recognize the size of the scan target during the scanning process without being limited by the number of sensors and other factors, while the conventional image acquiring method and the related image acquiring apparatus cost a lot. The image acquiring apparatus and the image acquiring method disclosed by the present invention can perform the scanning operation efficiently without using a CPU having higher capability and a faster direct memory access (DMA) controller, and no data missing conditions will occur.

Those skilled in the art will readily observe that numerous modifications and alterations of the device and method may be made while retaining the teachings of the invention.

What is claimed is:

1. An image acquiring apparatus, comprising:
   an image sensor, for outputting a plurality of first analog image signals corresponding to a plurality of pixels;
   an analog-to-digital converter (ADC), for converting the plurality of first analog image signals to a plurality of digital image signals;
   a digital-to-analog converter (DAC), coupled to the ADC, for converting the plurality of digital image signals to a plurality of second analog image signals, wherein each of which has an actual voltage value;
   a comparing unit, coupled to the DAC, for respectively comparing the actual voltage values of the plurality of second analog image signals with a reference voltage value so as to generate a plurality of corresponding comparing results;
   a counting unit, coupled to the comparing unit, for adjusting a counting value according to each of the comparing results; and
   a control unit, coupled to the counting unit, for determining whether to stop a scanning operation of the image acquiring apparatus or not according to the counting value.

2. The image acquiring apparatus of claim 1, wherein when one of the actual voltage values is higher than or equal to the reference voltage value, the counting unit decreases or increases the counting value according to the comparing result.

3. The image acquiring apparatus of claim 1, wherein when one of the actual voltage values is lower than or equal to the reference voltage value, the counting unit decreases or increases the counting value according to the comparing result.

4. The image acquiring apparatus of claim 1, wherein when the counting value does not reach a specific value, the control unit controls the scanning operation to continue according to the counting value; and when the counting value reaches the specific value, the control unit controls the scanning operation to stop according to the counting value.

5. The image acquiring apparatus of claim 4, wherein the pixels are pixels of a specific number of scan lines; when the counting unit adjusts the counting value according to the comparing result, the counting unit gradually increases the counting value from an initial value to the specific value, wherein a difference between the initial value and the specific value is corresponding to a total number of the pixels.

6. The image acquiring apparatus of claim 4, wherein the pixels are pixels of a specific number of scan lines; when the counting unit adjusts the counting value according to the comparing result, the counting unit gradually decreases the counting value from an initial value to the specific value, wherein a difference between the initial value and the specific value is corresponding to a total number of the pixels.

7. The image acquiring apparatus of claim 1, further comprising a background image, wherein the reference voltage value corresponds to a first gray level of the background image, and the actual voltage values correspond to a plurality of second gray levels of a target image, respectively.

8. The image acquiring apparatus of claim 1, wherein the ADC is an analog front end (AFE) element.

9. An image acquiring method, comprising:
   setting a reference voltage value;
   outputting a plurality of first analog image signals corresponding to a plurality of pixels;
   converting the plurality of first analog image signals to a plurality of digital image signals;
   converting the plurality of digital image signals to a plurality of second analog image signals, wherein each of which has an actual voltage value;
   respectively comparing the actual voltage values of the plurality of second analog image signals with a reference voltage value so as to generate a plurality of corresponding comparing results;
   adjusting a counting value according to each of the comparing results; and
   determining whether to stop a scanning operation or not according to the counting value.

10. The image acquiring method of claim 9, wherein the steps of respectively comparing the actual voltage values of the plurality of second analog image signals with the reference voltage value so as to generate the corresponding comparing results and adjusting the counting value according to each of the comparing results further comprises:

when one of the actual voltage values is higher than or equal to the reference voltage value, decreasing or increasing the counting value according to the comparing result.

11. The image acquiring method of claim 9, wherein the steps of respectively comparing the actual voltage values of the plurality of second analog image signals with the reference voltage value so as to generate the corresponding comparing results and adjusting the counting value according to each of the comparing results further comprises:

when one of the actual voltage values is lower than or equal to the reference voltage value, decreasing or increasing the counting value according to the comparing result.

12. The image acquiring method of claim 9, wherein the step of determining whether to stop the scanning operation or not according to the counting value further comprises:

when the counting value does not reach a specific value, continuing the scanning operation according to the counting value; and when the counting value reaches the specific value, stopping the scanning operation according to the counting value.

13. The image acquiring method of claim 12, wherein the pixels are pixels of a specific number of scan lines, and the step of adjusting the counting value further comprises:

gradually increasing the counting value from an initial value to the specific value;

wherein a difference between the initial value and the specific value is corresponding to a total pixel number of the pixels.

14. The image acquiring method of claim 12, wherein the pixels are pixels of a specific number of scan lines, and the step of adjusting the counting value further comprises:

gradually decreasing the counting value from an initial value to the specific value;

wherein a difference between the initial value and the specific value is corresponding to a total pixel number of the pixels.

15. The image acquiring method of claim 9, wherein the reference voltage value corresponds to a first gray level of a background image, and the actual voltage values correspond to a plurality of second gray levels of a target image, respectively.

* * * * *